United States Patent
Komura et al.

(10) Patent No.: US 7,821,365 B2
(45) Date of Patent: Oct. 26, 2010

(54) PERMANENT MAGNET MAGNETIZING APPARATUS AND PERMANENT MAGNET MAGNETIZING METHOD

(75) Inventors: Haruhiro Komura, Aichi (JP); Mikio Kitaoka, Shizuoka (JP); Ikuo Ohashi, Shizuoka (JP); Teruo Kiyomiya, Shizuoka (JP); Sachiko Shinmura, Shizuoka (JP); Masutaro Suzuki, Shizuoka (JP)

(73) Assignee: FDK Corporation, Tokyo (JP)

( * ) Notice: Subject to any disclaimer, the term of this patent is extended or adjusted under 35 U.S.C. 154(b) by 370 days.

(21) Appl. No.: 11/886,081

(22) PCT Filed: Mar. 16, 2006

(86) PCT No.: PCT/JP2006/305278

§ 371 (c)(1),
(2), (4) Date: Oct. 15, 2007

(87) PCT Pub. No.: WO2006/098410

PCT Pub. Date: Sep. 21, 2006

(65) Prior Publication Data

US 2008/0169892 A1    Jul. 17, 2008

(30) Foreign Application Priority Data

Mar. 17, 2005 (JP) ............................. 2005-078187
Apr. 12, 2005 (JP) ............................. 2005-114954
Dec. 14, 2005 (JP) ............................. 2005-360239

(51) Int. Cl.
*H01F 13/00* (2006.01)

(52) U.S. Cl. .................................................. 335/284
(58) Field of Classification Search .................. 335/284
See application file for complete search history.

(56) References Cited

U.S. PATENT DOCUMENTS

| 3,237,973 A | * | 3/1966 | Rumberger ................. 283/62 |
| 4,888,512 A | | 12/1989 | Shimizu |
| 4,950,335 A | * | 8/1990 | Couderchon ............... 148/102 |
| 5,597,527 A | * | 1/1997 | Cote ........................... 266/80 |
| 2004/0263303 A1 | | 12/2004 | Kuriyama et al. |

FOREIGN PATENT DOCUMENTS

| JP | 61-121405 A | 6/1986 |
| JP | 62-089313 A | 4/1987 |
| JP | 03-072606 A | 3/1991 |
| JP | 03-233910 A | 10/1991 |
| JP | 06-140248 A | 5/1994 |
| JP | 07-220924 A | 8/1995 |
| JP | 2001-268860 A | 9/2001 |
| JP | 2004-071853 A | 3/2004 |

* cited by examiner

*Primary Examiner*—Ramon M Barrera
(74) *Attorney, Agent, or Firm*—Harness, Dickey & Pierce, PLC

(57) ABSTRACT

To provide a magnetizing apparatus and magnetizing method in which, even in preparation of a ring-shaped permanent magnet having a narrow magnetization pitch with multiple poles magnetized on an extremely small diameter, sufficient magnetization and high magnetization quality can be achieved and powerful magnetization can be carried out efficiently and quickly at low cost.

A permanent magnet magnetizing apparatus includes a heating section 10, a magnetizing section 12 axially disposed as a discrete structure from the heating section 10, and a holding member 22 for holding magnetization object 20 and movable relative to the heating section and the magnetizing section. The magnetization object heated in the heating section is transferred to the magnetizing section and is magnetized therein.

10 Claims, 10 Drawing Sheets

PERMANENT MAGNET MAGNETIZING APPARATUS AND PERMANENT MAGNET MAGNETIZING METHOD

TECHNICAL FIELD

The present invention relates to an apparatus for magnetizing a permanent magnet and a method for magnetizing a permanent magnet.

BACKGROUND ART

Typically, a coil-energization magnetizing apparatus is used for the purpose of multipole magnetization of a ring-shaped permanent magnet rotor, which is incorporated in, for example, a radial-gap-type permanent-magnet-stepping-motor. This kind of magnetizing apparatus is, for example, structured as follows: a magnetic yoke is provided with a magnetization-object-containing hole into and from which a ring-shaped permanent magnet—which is a magnetization object—can be inserted and taken out; a number of grooves extending in the axial direction are formed in the inner wall surface of the magnetization-object-containing hole; insulating-coating wires are laid in the grooves, respectively, and the neighboring insulating-coating wires are connected to form a continuous zigzag coil. In this magnetizing apparatus, magnetization is carried out as follows. A magnetization object is set in the magnetization-object-containing hole, an electric charge stored in a capacitor is instantaneously discharged, and thereby a pulse current passes through the coil to generate a magnetic field, which magnetizes the magnetization object.

Meanwhile, as is commonly known, recent remarkable miniaturization of electronic devices has promoted reduction in the size and diameter of stepping motors used in such electronic devices. In conducting multipole magnetization of a ring-shaped permanent magnet to be used as a rotor, a large pulse current is applied using the coil-energization magnetizing apparatus of the type mentioned above. However, due to the reduction in diameter of the ring-shaped permanent magnet, the magnetization pitch (interval between magnetization poles) has become narrow, which in turn has resulted in reduction of the wire diameter of the coil provided in the magnetizing apparatus. As a result, only a limited amount of electric current can be supplied, leading to a problem that it is difficult to obtain sufficient magnetization characteristics.

As an approach to solve this problem, there is proposed a method for conducting multipole magnetization using at least four poles, the multipole magnetization being achieved by disposing a plurality of permanent magnets radially and thereby forming a plurality of alternative magnetic poles in the central portion, and placing a magnetization object in the central portion (refer to Patent Document 1). With this magnetizing apparatus utilizing permanent magnets, insufficient magnetization, which becomes problematic in cases where the pitch between the magnetic poles for magnetizing a magnetization object is narrowed down, can indeed be improved to a certain degree.

Still, the demand for further miniaturization (diameter reduction) and performance enhancement of stepping motors has been ever increasing in recent years. For example, for automatic focus mechanisms of portable imaging devices, stepping motors using ring-shaped permanent magnets which are magnetized so as to have multiple poles with narrow pitches, and which thereby allow high-precision control of lens actuators, have become important electronic components in order to achieve high-resolution images. For the ring-shaped permanent magnet constituting the rotor for this purpose, there are some requirements to be satisfied: achieving narrow pitch configuration—e.g., with a diameter of equal to or less than 3 mm and with ten or more magnetization poles—and at the same time, obtaining the magnetization characteristic of the saturation magnetization level. Conventional magnetizing methods including the above-mentioned magnetizing method utilizing permanent magnets are not effective enough to achieve such a magnetized structure; the required magnetization level cannot be met, and variation between the peak values of surface magnetic flux density may lead to a big problem.

As a technology aiming to improve insufficient magnetization, there is proposed a method of magnetizing a magnetization object utilizing the phenomenon that the magnetizing force required for reaching saturation is reduced in a hot atmosphere or liquid (for example, refer to Patent Document 2). The disclosure of Patent Document 2 is as follows. For example, for a Pr—Fe—B magnet, which is a kind of rare-earth permanent magnet, the required magnetizing force at 100 degrees centigrade is less than that at 25 degrees centigrade. Therefore, magnetization in this temperature range allows stable saturation magnetization to be achieved with a weak magnetic force.

However, actual magnetization using this method has revealed that, in preparation of a ring-shaped permanent magnet having a narrow magnetization pitch with multiple poles magnetized on an extremely small diameter as mentioned above, although the average surface-magnetic-flux-density peak value of all poles is improved to a certain degree, variation between the surface-magnetic-flux-density peak values is still significant, and therefore it is considerably difficult to obtain high magnetization quality.

Patent Document 1: Japanese Patent Application Laid-open Publication No. 2001-268860

Patent Document 2: Japanese Patent Application Laid-open Publication No. 6-140248

DISCLOSURE OF THE INVENTION

An object of the present invention is to provide a magnetizing apparatus and magnetizing method in which, even in preparation of a ring-shaped permanent magnet having a narrow magnetization pitch with multiple poles magnetized on an extremely small diameter, sufficient magnetization and high magnetization quality can be achieved and powerful magnetization can be carried out efficiently and quickly at low cost.

A first aspect of the present invention contrived to achieve the foregoing object is a permanent magnet magnetizing apparatus including a heating section, a magnetizing section axially disposed as a discrete structure from the heating section, and a holding member for holding a magnetization object and that is movable relative to the heating section and the magnetizing section, wherein the magnetization object heated in the heating section is transferred to the magnetizing section and is magnetized therein.

A second aspect of the present invention is the permanent magnet magnetizing apparatus according to the first aspect, wherein the heating section uses an inner surface of a heating space for containing the magnetization object as a heating surface, the magnetizing section uses an inner surface of a magnetizing space for containing the magnetization object as a magnetizing surface, and the holding member is in the form of a bar extending through the heating and magnetizing sections and is disposed so as to be movable in the axial direction.

A third aspect of the present invention is the permanent magnet magnetizing apparatus according to the first aspect, wherein the heating section and the magnetizing section are supported so that at least one of the heating section and the magnetizing section is movable toward and away from the other, and the magnetization object is heated in the heating section when the magnetizing and heating sections are in a spaced-apart relation to each other, the magnetizing and heating sections are brought closer to each other while the magnetization object is still being heated, the magnetization object is then transferred to the magnetizing section to be magnetized therein, and then the magnetizing and heating sections are brought into a spaced-apart relation.

A fourth aspect of the present invention is the permanent magnet magnetizing apparatus according to the first or second aspect, wherein the magnetizing section includes a temperature control mechanism, and the magnetization object, after being heated in the heating section, is transferred to the magnetizing section whose temperature is controlled, and is magnetized therein.

A fifth aspect of the present invention is the permanent magnet magnetizing apparatus according to the first or second aspect, wherein the temperature of the heating section is set to a temperature equal to or higher than the Curie point of the magnetization object, the temperature of the magnetizing section is set to a temperature lower than the Curie point of the magnetization object, and the magnetization object is heated in the heating section, and then is transferred to the magnetizing section and is magnetized therein.

A sixth aspect of the present invention is the permanent magnet magnetizing apparatus according to the third aspect, wherein the heating section has a cylindrical structure and uses its inner surface as a heating surface, the magnetizing section has a cylindrical structure arranged coaxially with the heating section, and uses its inner surface as a magnetizing surface, and the holding member is in the form of a bar extending through the heating and magnetizing sections and is disposed so as to be movable in the axial direction relative to the heating and magnetizing sections.

A seventh aspect of the present invention is the permanent magnet magnetizing apparatus according to the fourth aspect, wherein the heating section has a cylindrical structure and uses its inner surface as a heating surface, the magnetizing section includes a temperature control section, has a cylindrical structure, uses its inner surface as a magnetizing surface, and is arranged coaxially with the heating section so that the positional relationship to the heating section is invariable, and the holding member is in the form of a bar extending through the heating and magnetizing sections and is disposed so as to be movable in the axial direction relative to the heating and magnetizing sections.

An eighth aspect of the present invention is the permanent magnet magnetizing apparatus according to the first or second aspect, wherein the heating section has a cylindrical structure and uses its inner surface as a heating surface, the magnetizing section has a cylindrical structure and uses its inner surface as a magnetizing surface, and the magnetizing section is disposed above the heating section coaxially therewith, the heating section and the magnetizing section are therefore arranged in the vertical direction, and the distance between the heating section and the magnetizing section is variable, so that the magnetizing section is heated by a convection flow from the heating section and the temperature of the magnetizing section is controlled by adjusting the distance.

A ninth aspect of the present invention is the permanent magnet magnetizing apparatus according to the fifth aspect, wherein the heating section and the magnetizing section are supported so that their positional relationship is invariable, and a heat insulating member is interposed therebetween.

A tenth aspect of the present invention is the permanent magnet magnetizing apparatus according to the fifth aspect, wherein the magnetizing section includes a non-magnetic block provided with a magnetization-object-containing hole in the center thereof as a magnetizing space, the magnetization-object-containing hole allows the magnetization object to be inserted therein and taken out therefrom, a number of grooves are arranged equiangularly and radiating outward from the inner surface of the magnetization-object-containing hole, and magnetizing permanent magnets are laid in the respective grooves.

An eleventh aspect of the present invention is the permanent magnet magnetizing apparatus according to the third or fourth aspect, wherein the magnetizing section includes a non-magnetic block provided with a magnetization-object-containing hole in the center thereof as a magnetizing space, the magnetization-object-containing hole allows the magnetization object to be inserted therein and taken out therefrom, a number of grooves are arranged equiangularly and radiating outward from the inner surface of the magnetization-object-containing hole, and magnetizing permanent magnets each having a Curie point higher than that of the magnetization object are laid in the respective grooves.

A twelfth aspect of the present invention is the permanent magnet magnetizing apparatus according to the fifth aspect, wherein the magnetizing section includes a temperature control unit capable of controlling the temperature to a temperature equal to or higher than room temperature and lower than the Curie point of the magnetization object.

A thirteenth aspect of the present invention is the permanent magnet magnetizing apparatus according to the twelfth aspect, wherein, in the magnetizing section, there are arranged a plurality of magnetizing permanent magnets each having a Curie point higher than that of the magnetization object, and in the temperature control unit, a temperature at which permanent demagnetization of the magnetizing permanent magnets does not occur is set as an upper limit temperature.

A fourteenth aspect of the present invention is the permanent magnet magnetizing apparatus according to the twelfth aspect, wherein, in the magnetizing section, Nd-type sintered magnets are arranged, and in the temperature control unit, a temperature at which permanent demagnetization of the Nd-type sintered magnets used for magnetization does not occur is set as an upper limit temperature.

A fifteenth aspect of the present invention is the permanent magnet magnetizing apparatus according to the ninth aspect, wherein the heating section has a cylindrical structure and uses its inner surface as a heating surface, the magnetizing section has a cylindrical structure arranged coaxially with the heating section and uses its inner surface as a magnetizing surface, the holding member is in the form of a bar extending through the heating and magnetizing sections and is disposed so as to be movable in the axial direction relative to the heating and magnetizing sections, and a vertical arrangement is employed so that the heating section is disposed above the magnetizing section and the axis extends vertically.

A sixteenth aspect of the present invention is the permanent magnet magnetizing apparatus according to the fifth aspect, wherein the magnetizing apparatus employs a vertical arrangement in which the heating section and the magnetizing section are arranged vertically and the axis extends vertically.

A seventeenth aspect of the present invention is the permanent magnet magnetizing apparatus according to the sixth aspect, wherein the magnetizing apparatus employs a vertical arrangement in which the heating section and the magnetizing section are arranged vertically and the axis extends vertically.

A eighteenth aspect of the present invention is the permanent magnet magnetizing apparatus according to the fifth aspect, wherein the magnetizing apparatus employs a horizontal arrangement in which the heating section and the magnetizing section are arranged side by side and the axis extends horizontally.

A nineteenth aspect of the present invention is the permanent magnet magnetizing apparatus according to the sixth aspect, wherein the magnetizing apparatus employs a horizontal arrangement in which the heating section and the magnetizing section are arranged side by side and the axis extends horizontally.

Furthermore, a twentieth aspect of the present invention is a permanent magnet magnetizing method, including applying a magnetizing field to a permanent magnet which is a magnetization object using a magnetizing section, and cooling the magnetization object from a temperature equal to or higher than the Curie point of the object to a temperature lower than the Curie point, and during this cooling, continuing to apply the magnetizing field to the magnetization object using the magnetizing section, wherein a temperature of the magnetizing section when the magnetization object is removed from the magnetizing section is controlled to a temperature higher than an upper limit of an operation temperature or a guaranteed temperature of an electromagnetic device in which the magnetization object is incorporated in order to prevent initial demagnetization, and the surface magnetic flux density of the magnetization object is adjusted according to the temperature of the magnetizing section by utilizing a thermal demagnetization effect.

It is more preferable that, in the above magnetizing method, the temperature of the magnetizing section is controlled to a constant temperature within the temperature range of above 100 degrees centigrade to equal to or lower than a temperature 50 degrees centigrade below the Curie point Tc (the Curie point Tc −50 degrees centigrade), and this magnetizing method is a twenty-first aspect of the present invention.

Figure 1:
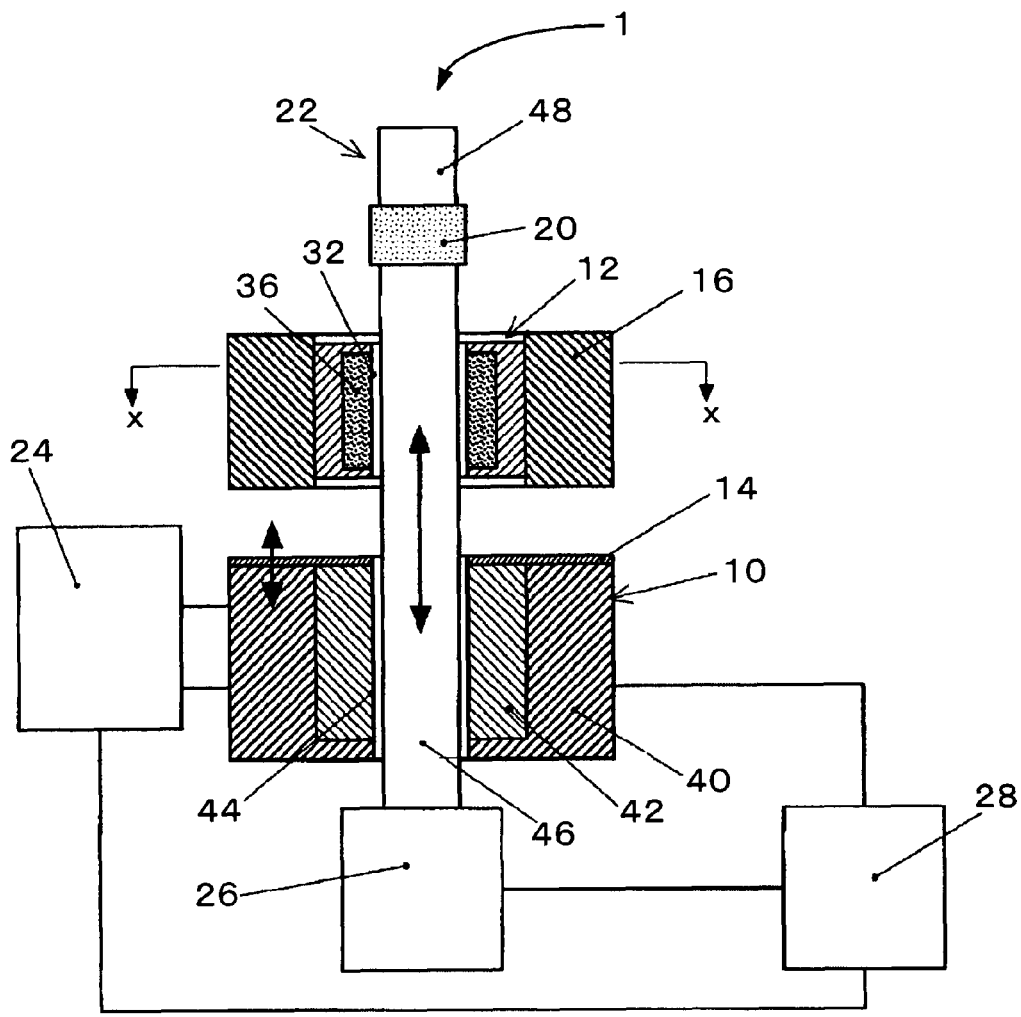
FIG. 1 illustrates a magnetizing apparatus of a first embodiment of the present invention.

DESCRIPTION OF THE REFERENCE NUMERALS 1, 1b, 1c MAGNETIZING APPARATUS
2, 2b MAGNETIZING APPARATUS
3 MAGNETIZING APPARATUS
10 HEATING SECTION
12 MAGNETIZING SECTION
16 COOLING SECTION
20 MAGNETIZATION OBJECT
22 HOLDING MEMBER
24 HEATING SECTION DRIVING MECHANISM
26 HOLDING MEMBER DRIVING MECHANISM
28 CONTROL SECTION
60 TEMPERATURE CONTROL SECTION
62 HEAT TRANSFER SECTION OF MAGNETIZING SECTION

DETAILED DESCRIPTION OF THE INVENTION

First Embodiment

FIG. 1 illustrates a magnetizing apparatus according to a first embodiment of the present invention. The magnetizing apparatus 1 includes a cylindrical heating section 10 having an inner surface operable as a heating surface, and a cylindrical magnetizing section 12 having an inner surface operable as a magnetizing surface. The heating section 10 and the magnetizing section 12 are discrete bodies and arranged axially (along the axial direction). This embodiment employs a vertical arrangement in which the axis extends vertically. Thus, the heating section 10 and the magnetizing section 12 are vertically arranged with the section 10 on the lower side and the section 12 on the upper side. The heating section 10 and the magnetizing section 12 are supported so that at least one of the sections 10 and 12 is movable toward and away from the other. When the heating section 10 and the magnetizing section 12 are in a spaced-apart relation, the space therebetween is wide enough to prevent the magnetizing section 12 from being excessively heated. It is preferable to provide a thin heat insulating member 14 over the top surface of the heating section 10. A cooling section 16 is disposed around the outer surface of the magnetizing section 12. A rod-like holding member 22 for holding a magnetization object (permanent magnet) 20 is disposed through the heating section 10 and the magnetizing section 12 so as to be movable in the axial direction relative to the sections 10 and 20. In this embodiment, the magnetizing section 12 is fixed, while the heating section 10 is movable toward and away from the magnetizing section 12 by being driven to move in the vertical direction by an up-down driving mechanism 24. The holding member 22 retaining the magnetization object 20 is driven to move in the vertical direction by an up-down driving mechanism 26 so that the magnetization object 20 thereon moves relative to the heating section 10 and the magnetizing section 12. Because the holding member 22 is lighter in weight, it is quicker to move the member 22. In some embodiments, the holding member may be fixed and the heating and magnetizing sections may be driven by the driving mechanism to move relative to the magnetization object. A control section 28 controls the temperature of the heating section 10, operations (for example, position and stop time) of the up-down driving mechanism 24 for the heating section 10 and the up-down driving mechanism 26 for the holding member 22, and the like.

Figure 2:
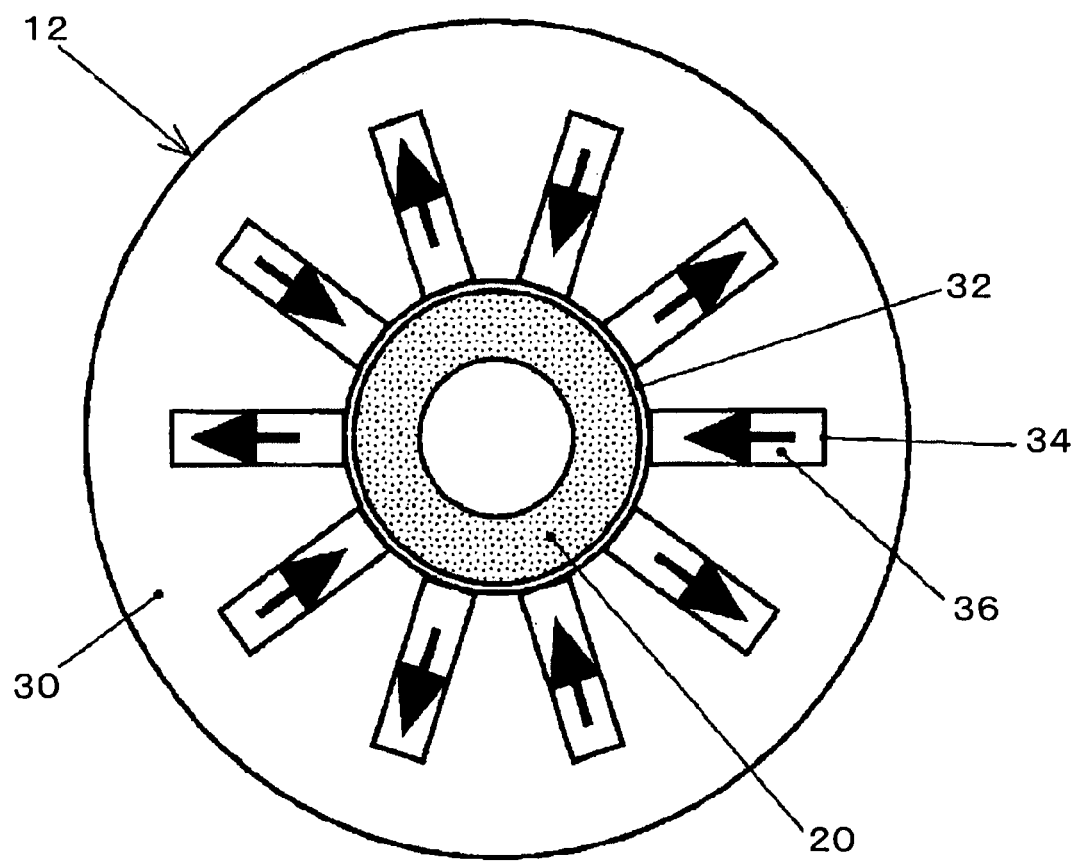
FIG. 2 is a horizontal sectional view showing an exemplary inner structure of a magnetizing section included in the magnetizing apparatus.

FIG. 2 shows an exemplary inner structure of the magnetizing section. The illustrated embodiment employs the permanent magnet method, in which a magnetization object is magnetized under the influence of a magnetic field generated by a permanent magnet. FIG. 2 is a horizontal sectional view taken along the line x-x in FIG. 1. In the illustrated embodiment, the magnetization object 20 is a ring-shaped permanent magnet and is to be magnetized into a 10-pole magnet. The magnetizing section 12 includes a non-magnetic block 30 (for example, a stainless-steel block) provided with a circular magnetization-object-containing hole 32 in the center of the block 30 into and from which the magnetization object 20 can be inserted and taken out, ten equiangularly-arranged grooves 34 having rectangular cross sections and radiating from the inner wall surface of the magnetization-object-containing hole 32, and bar-like magnetizing permanent magnets 36 laid in the respective grooves 34 and each having a quadrangular cross section and a Curie point higher than that of the magnetization object. Thus, the inner surface of the magnetizing section 12 serves as the magnetizing surface.

The heating section 10 includes a heating section main body 40 disposed on the outer side thereof, and a heat transfer section 42 disposed on the inner side thereof. A number of sheathed heaters (resistance heaters) extending in the axial direction are disposed in the main body 40 in a cylindrical arrangement. The heat generated on the heating section main body 40 is transferred inwardly through the heat transfer section 42 which is made of a material with good thermal conductivity, such as brass. Thus, the inner surface of the heat transfer section 42 serves as the heating surface. The heating section 10 is capable of heating the magnetization object placed inside a magnetization-object-containing hole 44 to a temperature equal to or higher than the Curie point of the object, and keeping a predetermined constant temperature.

The bar-like holding member 22, which retains the ring-shaped magnetization object 20, includes a lower support 46 and an upper retainer 48 and is configured to retain the magnetization object 20 from above and below. It should be appreciated that the object 20 may be retained only with the lower support. As the heating section 10 heats the object 20, the surrounding air is also heated, and the heated air rises so that the magnetizing section 12 would be heated. The heat insulating member 14 serves to prevent the magnetizing section 12 positioned above the heating section 10 from being heated, which otherwise might be heated by natural convection or the like. The heat insulating material 14 may be made of any heat-resisting and heat-insulating material. The cooling section 16 serves to cool the magnetizing section 12 and keep the temperature of the magnetizing section 12 substantially constant. The temperature of the heating section 10 is controlled at a constant temperature and the cooling section 16 cools the magnetizing section 12 by natural cooling, so that the temperature of the magnetizing section 12 is kept substantially constant. It should be appreciated that the temperature of the cooling section 16 may also be controlled.

Figure 3:
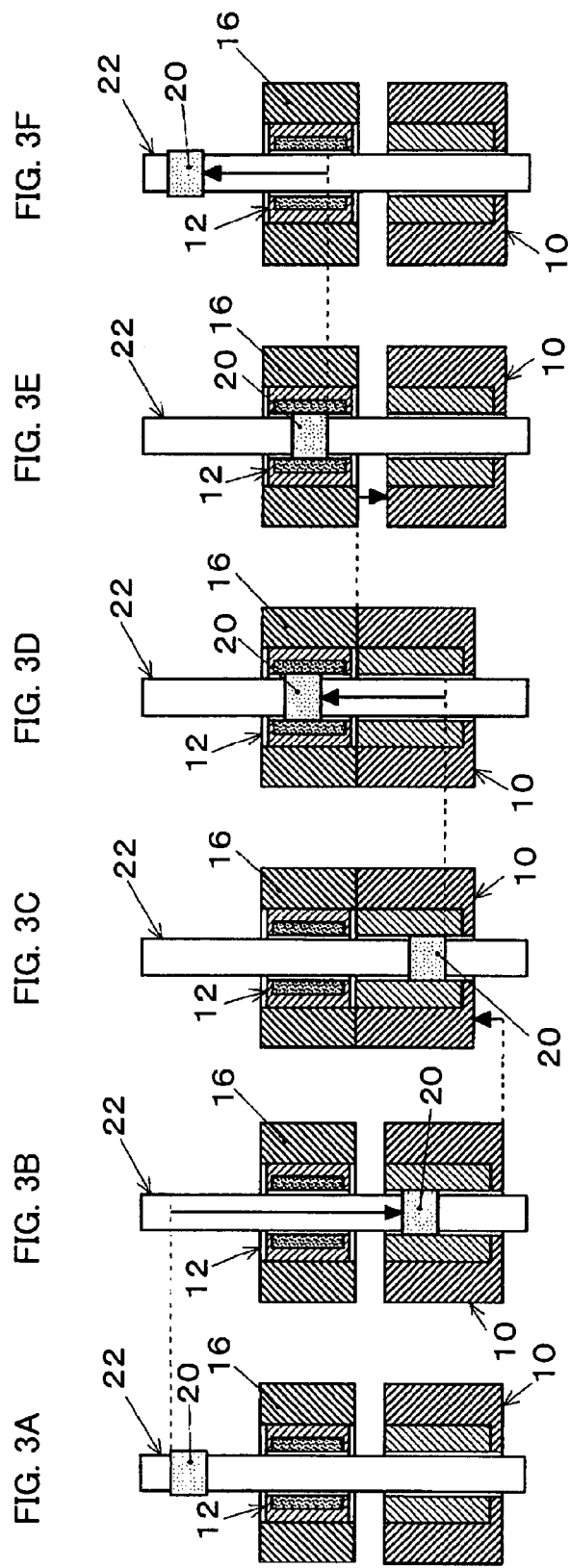
FIG. 3 illustrates how the magnetizing apparatus of the first embodiment operates.

FIG. 3 illustrates how the magnetizing apparatus operates.

A: Set Magnetization Object

FIG. 3A illustrates the holding member 22 with the magnetization object 20 set thereon. The magnetization object 20 is sandwiched between the lower support 46 and the upper retainer 48.

B: Heat Magnetization Object

The holding member 22 is lowered to place the magnetization object 20 in the heating section 10, and then the object 20 is heated to a predetermined temperature equal to or higher than the Curie point of the object. For example, if the magnetization object 20 is a NdFeB isotropic magnet (Curie point: approximately 350 degrees centigrade), the object 20 is heated to a temperature of around 380 degrees centigrade in the heating section 10.

C: Move Heating Section

The holding member 22 is held in the same position (i.e., the position of the magnetization object 20 is unchanged), while the heating section 10 is raised so that the top surface of the heating section 10 (the insulating material, although not shown in FIG. 3, is disposed over the top surface, as indicated by the reference numeral 14 in FIG. 1) closely contacts with the bottom surface of the magnetizing section 12.

D: Magnetization

The holding member 22 is raised so that the magnetization object 20 enters the magnetizing section 12, in which the object 20 is magnetized by being subjected to a predetermined magnetizing field created by the magnetizing permanent magnets.

E: Cooling

Once the magnetization object 20 is transferred into the magnetizing section 12, the heating section 10 is lowered immediately. Thus, the magnetizing section 12 is cooled by the cooling section 16. During the cooling, the magnetization object 20 is continuously subjected to the magnetizing field in the magnetizing section 12. In this way, the magnetization object 20 is cooled to a temperature below its Curie point while being held in the magnetizing section 12. (The experiment result has revealed that it is preferable to drop the temperature to equal to or lower than a temperature 50 degrees centigrade below Tc (Tc−50 degrees centigrade).) Thus, it is possible to maximize magnetization of the magnetization object, and to fully magnetize the object, so that a sufficiently strong magnetic force can be obtained when the magnetization object is cooled to a temperature below its Curie point.

F: Remove Magnetization Object

Upon completing the magnetization, the holding member 22 is further raised so that the magnetization object 20 exits from the magnetizing section 12 and then is removed, which consummates the magnetization cycle. When the magnetization object 20 has an extremely small diameter and a small heat capacity, it is possible to take only several seconds to finish the magnetization cycle, although it depends on the size of the object.

Generally, as the magnetization object is transferred from the heating section to the magnetizing section, the temperature of the object rapidly drops. Therefore, it is preferable to reduce the distance of movement to the magnetizing section and the time therefor as much as possible. In the first embodiment, the heating section 10 is movable relative to the magnetizing section 12, and is capable of closely contacting with the magnetizing section 12. While the heating section 10 closely contacts with the magnetizing section 12, the magnetization object 20 is transferred from the heating section 10 to the magnetizing section 12. Thus, since the heating section 10 closely contacts with the magnetizing section 12, it is possible to prevent the excessive drop of the temperature of the magnetization object 20 while the object is transferred. Moreover, since the object 20 moves a short distance, the moving time is reduced and therefore the operation can be quickened and productivity can be improved. Furthermore, in the home position, the heating section 10 is spaced apart from the magnetizing section 12. Therefore it is unlikely that the magnetizing section 12 is excessively heated.

Figure 4:
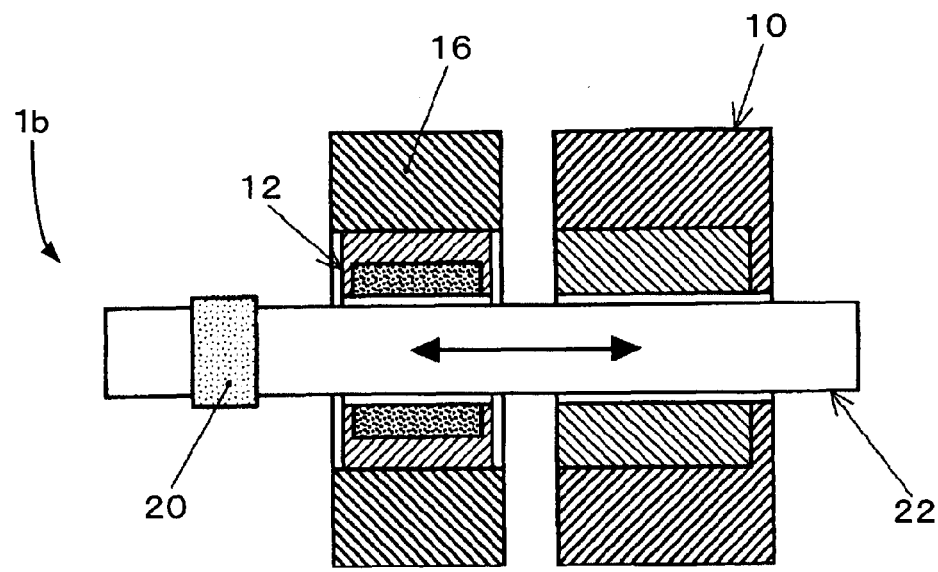
FIG. 4 illustrates a modification of the magnetizing apparatus of the first embodiment.
Figure 5:
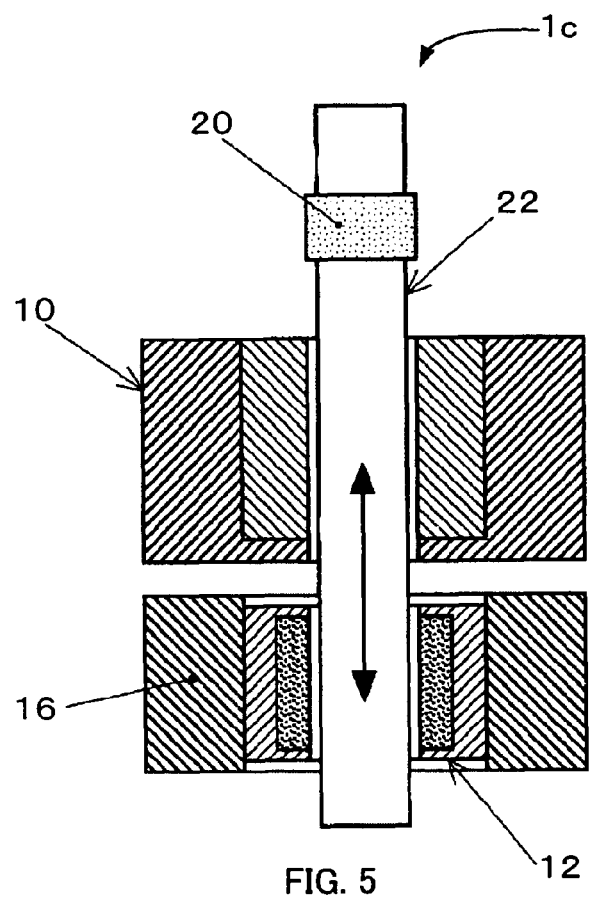
FIG. 5 illustrates another modification of the magnetizing apparatus of the first embodiment.

FIGS. 4 and 5 are vertical sections illustrating modifications of the magnetizing apparatus according to the first embodiment. Basically, these modifications have the same structures as that of the magnetizing apparatus 1 shown in FIG. 1. Therefore, the same reference numerals are assigned to the corresponding members, mechanisms and the like of the modifications. Thus, a magnetizing apparatus 1b shown in FIG. 4 and a magnetizing apparatus 1c shown in FIG. 5 include the cylindrical heating section 10 having an inner surface operable as a heating surface, and the cylindrical magnetizing section 12 having an inner surface operable as a magnetizing surface. The heating section 10 and the magnetizing section 12 are discrete bodies and arranged along the axial direction.

The embodiment illustrated in FIG. 4 employs a horizontal arrangement in which the axis extends horizontally. Thus, the heating section 10 and the magnetizing section 12 are arranged side by side. The heating section 10 and the magnetizing section 12 are supported so that at least one of the sections 10 and 12 is movable toward and away from the other. The cooling section 16 is disposed around the outer surface of the magnetizing section 12. The rod-like holding member 22 for retaining the magnetization object 20 is disposed through the heating section 10 and the magnetizing section 12 so as to be movable in the axial direction relative to the sections 10 and 20. In this embodiment, the magnetizing section 12 and the heating section 10 are horizontally arranged. Therefore, a wide space therebetween is not necessary in order to prevent the magnetizing section from being heated by, for example, natural convection. The magnetization object 20 is heated in the heating section 10, and the heating section 10 shifts to closely contact with the magnetizing section 12, and then the heated object 20 is horizontally transferred to the left to be magnetized in the magnetizing section 12. The driving mechanism for horizontal movement of the magnetization object and the control section are omitted in FIG. 4.

The magnetizing apparatus illustrated in FIG. 5 includes the cylindrical heating section 10 having an inner surface operable as a heating surface, and the cylindrical magnetizing section 12 having an inner surface operable as a magnetizing surface. The heating section 10 and the magnetizing section 12 are discrete bodies and arranged along the axial direction. This embodiment also employs the vertical arrangement in which the axis extends vertically, but the magnetizing section 12 is disposed on the lower side and the heating section 10 is on the upper side in this embodiment. The heating section 10 and the magnetizing section 12 are supported so that at least one of the sections 10 and 12 is movable toward and away from the other. The cooling section 16 is disposed around the outer surface of the magnetizing section 12. The rod-like holding member 22 for retaining the magnetization object 20 is disposed through the heating section 10 and the magnetizing section 12 so as to be movable in the axial direction relative to the sections 10 and 20. In this embodiment, because the magnetizing section is positioned below the heating section, it is unlikely that the magnetizing section is heated by, for example, natural convection. Therefore, also in this embodiment, a wide space between the magnetizing section 12 and the heating section 10 is not needed and it is possible to arrange the sections 12 and 10 near each other, leading to miniaturization of the apparatus. The magnetization object 20 is heated in the heating section 10, and then the heating section 10 and the magnetizing section 12 closely contact with each other, and the heated object 20 is lowered to be magnetized in the magnetizing section 12.

As described above, in the first embodiment, the heating section 10 and the magnetizing section 12 are structured as discrete bodies and supported so that at least one of the sections 10 and 12 is movable toward and away from the other, and the holding member 22 for the magnetization object 20 is movable relative to the heating section 10 and the magnetizing section 12. In such an apparatus, it is possible to continuously and easily carry out operations of heating the magnetization object 20 to a temperature equal to or higher than the Curie point in the heating section 10, transferring the object 20 quickly to the magnetizing section 12 and cooling the object 20 to a temperature lower than the Curie point while applying a magnetizing field to the object. Therefore, magnetization workability can be improved. As a result, it is possible to, even in preparation of a ring-shaped permanent magnet having a narrow magnetization pitch with multiple poles magnetized on an extremely small diameter, achieve sufficient magnetization and high magnetization quality and carry out powerful magnetization efficiently at low cost.

Second Embodiment

Figure 6:
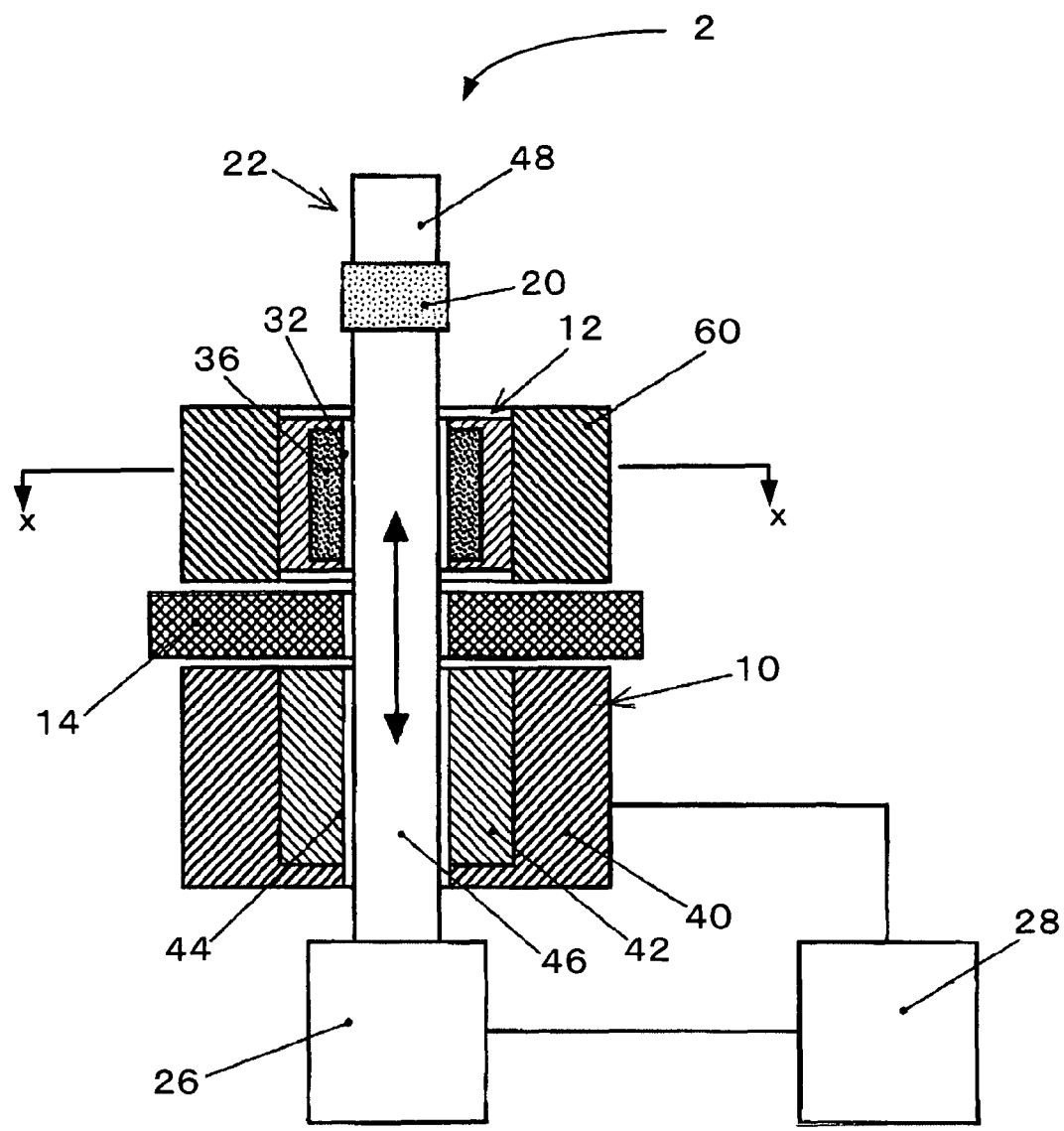
FIG. 6 illustrates a magnetizing apparatus of a second embodiment of the present invention.

FIG. 6 illustrates a magnetizing apparatus according to a second embodiment of the present invention. In FIG. 6, the same reference numerals are assigned to the members, mechanisms and the like corresponding to those of the magnetizing apparatus 1 shown as the first embodiment in FIG. 1. The magnetizing apparatus 2 illustrated in FIG. 6 includes the cylindrical heating section 10 having an inner surface operable as a heating surface, and the cylindrical magnetizing section 12 having an inner surface operable as a magnetizing surface. The heating section 10 and the magnetizing section 12 are discrete bodies and arranged axially (along the axial direction). This embodiment employs the vertical arrangement in which the axis extends vertically, and the heating section 10 and the magnetizing section 12 are vertically arranged with the section 10 on the lower side and the section 12 on the upper side. The heating section 10 and the magnetizing section 12 are disposed in a spaced-apart relation to each other such that the positional relationship therebetween is not variable. The structure of the heating section 10 is the same as that shown in FIG. 2.

In the magnetizing apparatus 2 of the second embodiment, the heat insulating member 14 is interposed between the heating section 10 and the magnetizing section 12. A temperature control section 60 is disposed around the outer surface of the magnetizing section 12. The rod-like holding member 22 for retaining the magnetization object (permanent magnet) 20 is disposed through the heating section 10 and the magnetizing section 12 so as to be movable in the axial direction relative to the sections 10 and 20. In this embodiment, the heating section 10 and the magnetizing section 12 are fixed, and the holding member 22 is driven to move in the vertical direction by the up-down driving mechanism 26 so that the magnetization object 20 moves therewith. Because the holding member 22 is lighter in weight, it is quicker to move the member 22. In some embodiments, the holding member 22 may be fixed and the heating and magnetizing sections 10 and 12 may be driven to move by a driving mechanism. The control section 28 controls the temperatures of the heating section 10 and the temperature control section 60, operation of the up-down driving mechanism 26 (for example, position and stop time of the magnetization object), and the like.

The bar-like holding member 22, which retains the ring-shaped magnetization object 20, includes the lower support 46 and the upper retainer 48 and is configured to retain the magnetization object 20 from above and below. It should be appreciated that the object 20 may be retained only with the lower support. As the heating section 10 heats the object 20, the surrounding air is also heated, and the heated air rises so that the magnetizing section 12 would be heated. The heat insulating member 14 serves to prevent the magnetizing section 12 positioned above the heating section 10 from being heated, which otherwise might be heated by natural convection or the like. The heat insulating member 14 may be made of any material and have any structure and shape (thickness), as long as the member 14 is heat-resisting and heat-insulating. The temperature control section 60 controls the temperature of the magnetizing section 12 to any temperature higher than 100 degrees centigrade and equal to or lower than a temperature 50 degrees centigrade below the Curie point Tc (more preferably, equal to or lower than 200 degrees centigrade). The temperature is preset according to the required surface magnetic flux density.

Figure 7A:
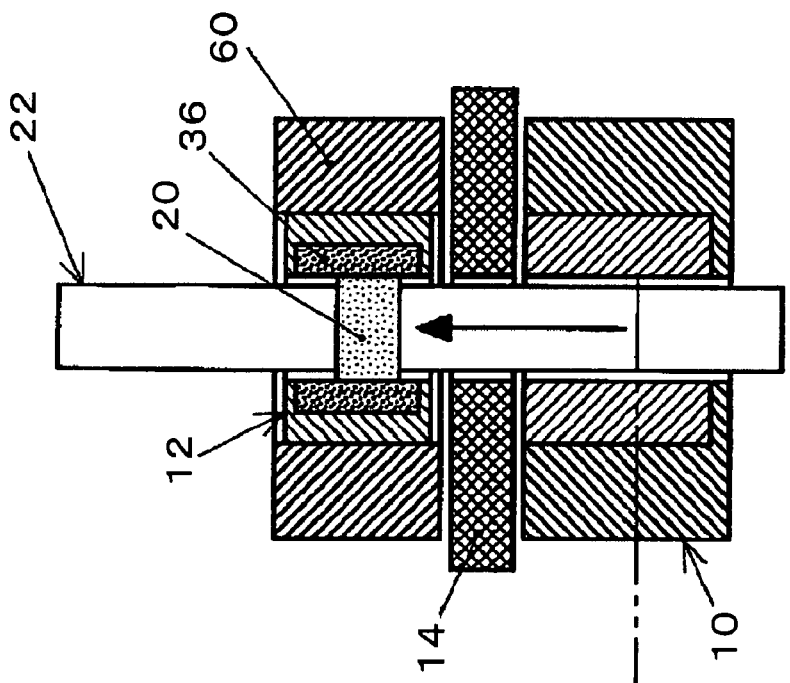
FIG. 7 illustrates how the magnetizing apparatus of the second embodiment operates.
Figure 7B:
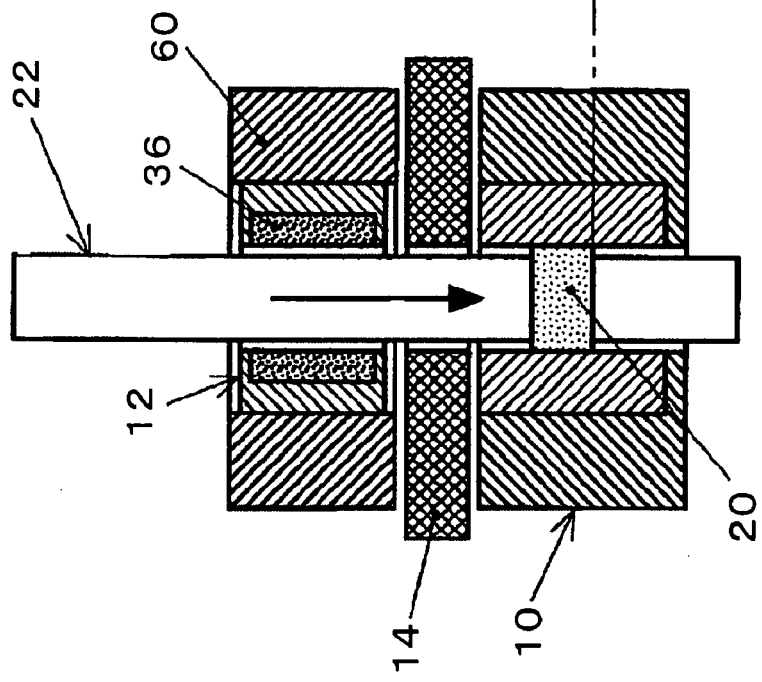

FIG. 7 illustrates how the magnetizing apparatus 2 operates. Specifically, FIG. 7A illustrates a heating process, and FIG. 7B illustrates a magnetizing process. As shown in FIG. 7A, the magnetization object 20 is placed in the heating section 10 and heated to a temperature equal to or higher than the Curie point of the object. For example, if the magnetization object is a NdFeB isotropic magnet (Curie point: approximately 350 degrees centigrade), the object 20 is heated to a temperature of around 380 degrees centigrade in the heating section 10. Then, the holding member 22 is quickly driven so that the magnetization object 20 is placed in the magnetizing section 12 as shown in FIG. 7B. In the magnetizing section 12, a predetermined magnetizing field is applied to the object 20 with the magnetizing permanent magnets 36. The magnetization object 20 is cooled to a temperature below the Curie point while being held in the magnetizing section 12. (The experiment result has revealed that it is preferable to drop the temperature to a temperature equal to or lower than a temperature 50 degrees centigrade below Tc.)

The temperature of the magnetizing section is controlled to any preset temperature by the temperature control section 60. Thus, it is possible to maximize magnetization of the magnetization object, and to fully magnetize the object, so that sufficient magnetic force can be generated when the magnetization object is cooled to a temperature below its Curie point. After that, the magnetization object 20 is taken out from the magnetizing section 12. In this way, the magnetization object 20 magnetized so as to have a surface magnetic flux density according to the temperature of the magnetizing section (the temperature when the object is taken out) is obtained. If the magnetization object 20 has an extremely small diameter and a small heat capacity, it is possible to take only several seconds to finish the magnetization cycle, although it depends on the size of the object.

Figure 8:
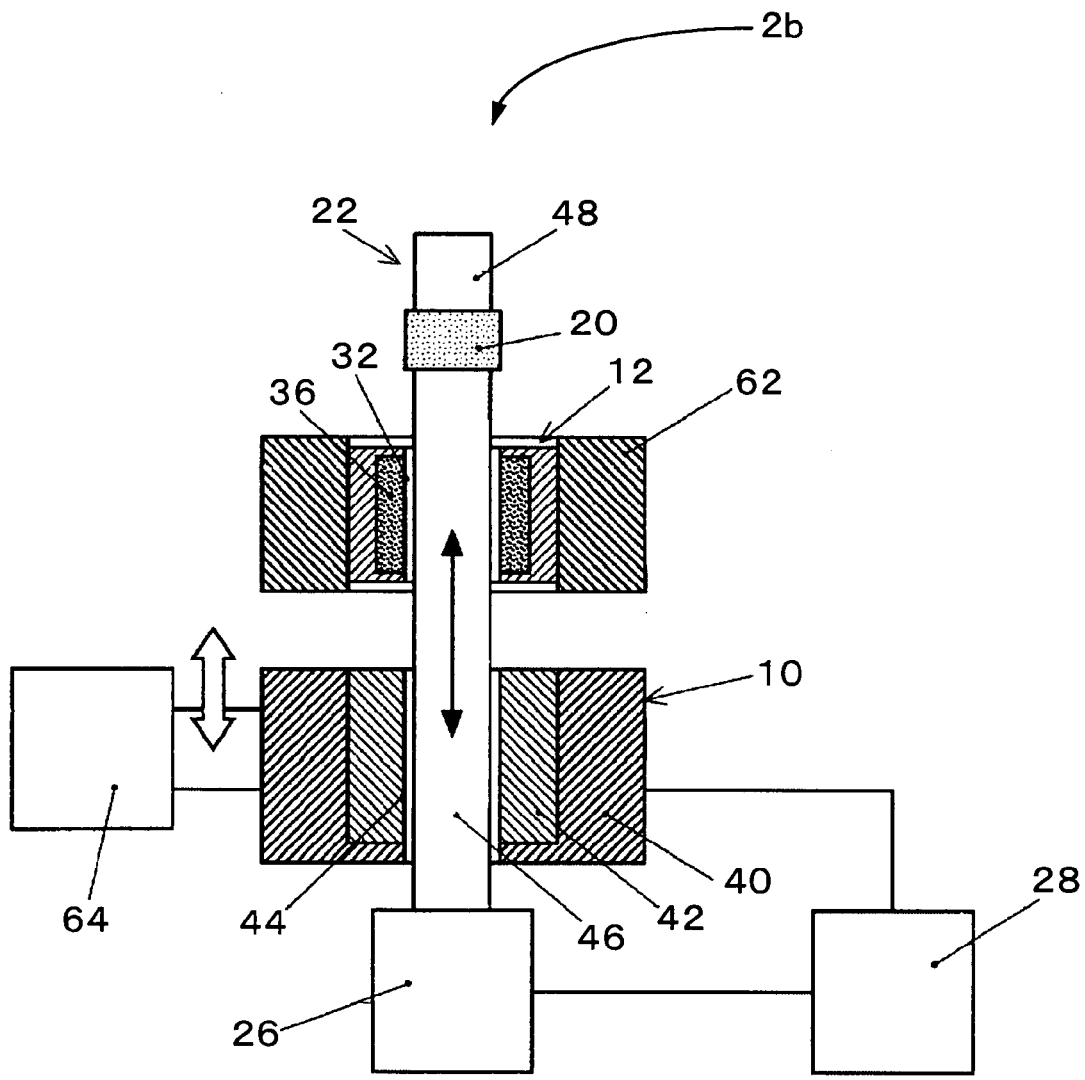
FIG. 8 illustrates a modification of the magnetizing apparatus of the second embodiment.

FIG. 8 is a vertical section illustrating a modification of the magnetizing apparatus according to the second embodiment. In FIG. 8, the same reference numerals are assigned to the members, mechanisms and the like corresponding to those of the magnetizing apparatuses 1 and 2 respectively shown in FIG. 1 and FIG. 6. A magnetizing apparatus 2b shown in FIG. 8 has a substantially similar structure to that of the magnetizing apparatus 1 shown as the first embodiment in FIG. 1, such that at least one of the heating section 10 and the magnetizing section 12 is movable toward and away from the other. However, in the magnetizing apparatus 2b, a heat transfer section 62, instead of the cooling section 16 or the temperature control section 60, is disposed around outer surface of the magnetizing section 12. Further, no heat insulating member is interposed between the heating section 10 and the magnetizing section 12. Furthermore, the control section 28 does not control the mechanism for driving the heating section 10 to move relative to the magnetizing section 12, but there is a movable mechanism 64 responsible for only raising and lowering the heating section 10.

In the magnetizing apparatus 2b, since the magnetizing section 12 is under natural cooling, the temperature of the section 12 stably shifts to a substantially constant equilibrium temperature. The equilibrium temperature depends on the distance between the heating section 10 and the magnetizing section 12. As the heating section 10 approaches the magnetizing section 12, the temperature of the magnetizing section becomes higher, while as the heating section 10 moves away from the magnetizing section 12, the temperature of the magnetizing section 12 becomes lower. Thus, the distance between the heating section 10 and the magnetizing section 12 is adjusted to control the temperature of the magnetizing section 12. The magnetization object 10, after being heated in the heating section 10, is transferred to and magnetized in the magnetizing section 12 whose temperature is controlled. Then, the magnetization object 20 is take out at a preset temperature of the magnetizing section, so that it is possible to prepare a permanent magnet with a desired surface magnetic flux density.

Third Embodiment

Figure 9:
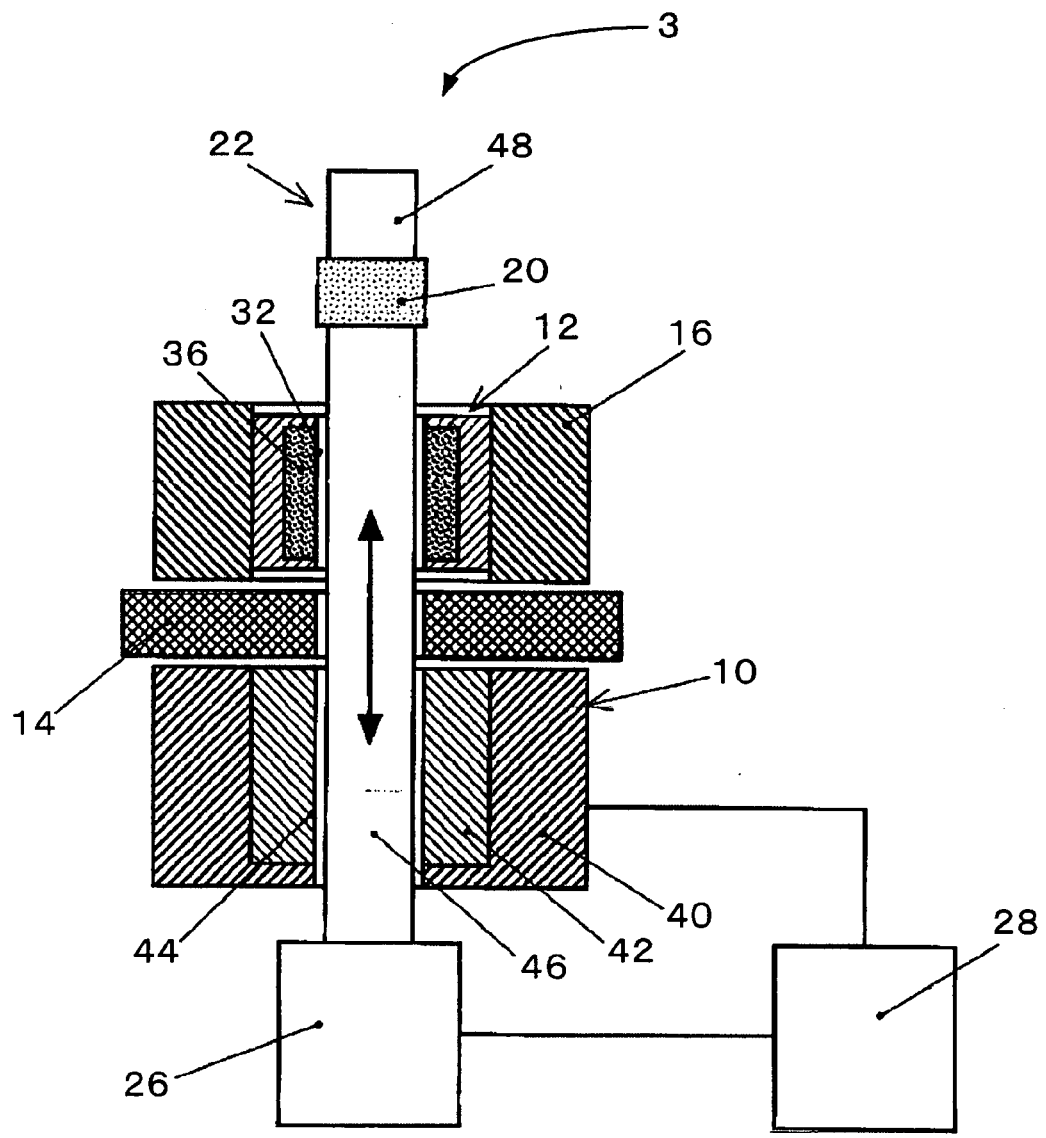
FIG. 9 illustrates a magnetizing apparatus of a third embodiment of the present invention.

FIG. 9 illustrates a magnetizing apparatus 3 according to a third embodiment of the present invention. The magnetizing apparatus 3 has a substantially similar structure to the magnetizing apparatus 2 shown as the second embodiment in FIG. 6. In FIG. 9, the same reference numerals are assigned to the members, mechanisms and the like corresponding to those of the magnetizing apparatus 2 shown in FIG. 6. The different point from the second embodiment is that the cooling section 16 is disposed on the outer side of the magnetizing section 12, instead of the temperature control section 60 of the magnetizing apparatus 2. The cooling section 16 serves to cool the magnetizing section 12 and keep the temperature of the magnetizing section 12 substantially constant. In some embodiments, the temperature of the cooling section 16 may also be controlled. The magnetizing apparatus of the third embodiment magnetizes the magnetization object 20 in the same manner as the illustration in FIG. 7. It should be noted that, similarly to the second embodiment, the third embodiment can employ the vertical arrangement in which the cylindrical heating section and magnetizing section are coaxially arranged in the vertical direction, as well as the horizontal arrangement in which the sections are coaxially arranged side by side.

Magnetization Characteristic

Figure 10:
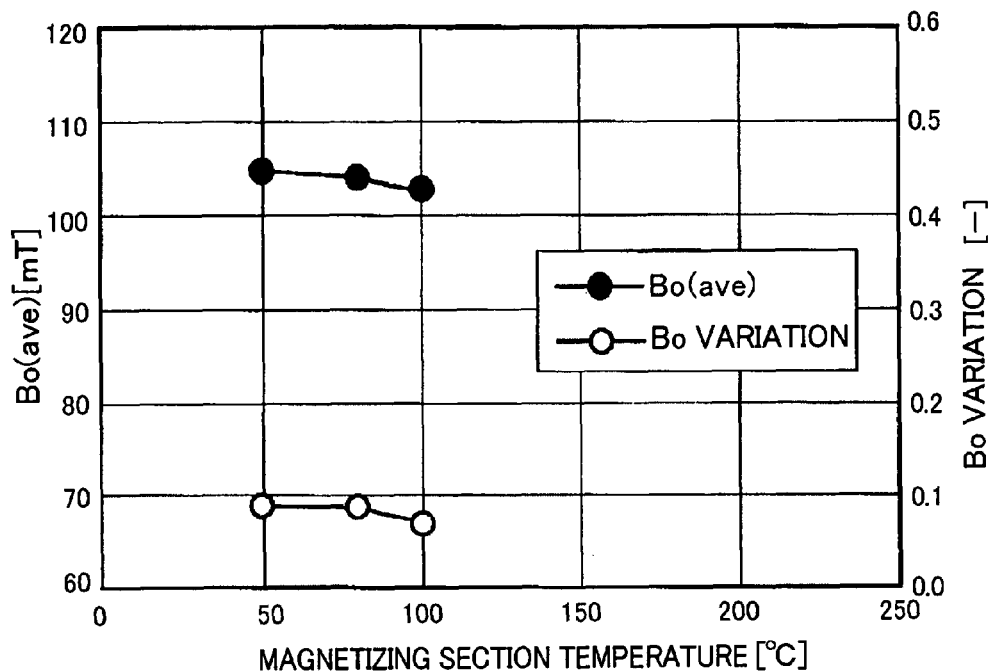
FIG. 10 is a graph showing relationships of "Bo(ave)" and "Bo variation" to the magnetizing-section temperature.

Now, the magnetization performance of a magnetizing apparatus according to the present invention is evaluated. This evaluation is performed based on the result of magnetizing a magnetization object in a ten-pole fashion using the magnetizing apparatus 2 of the second embodiment shown in FIG. 6. The magnetization object here was a ring-shaped Nd-type bonded magnet having an outer diameter of 1.6 mm, an inner diameter of 0.6 mm, and a height of 3.8 mm. Therefore in this case, the magnetization pitch would be 0.5 mm. The magnetizing magnets used here were Nd-type sintered magnets (Curie point: 320 degrees centigrade). Since permanent demagnetization (irreversible demagnetization) of these magnetizing magnets takes place at 120 degrees centigrade, the upper limit of the temperature controlled by the temperature control section 60 was preset to 100 degrees centigrade. Then, magnetization was started. The heating temperature was 380 degrees centigrade, and the magnetization object, immediately after having been heated, was transferred to the magnetizing section whose temperature was controlled, and then was magnetized. FIG. 10 shows the result of the magnetization characteristic evaluation. It should be noted that, since the magnetizing section has a large heat capacity compared to that of the magnetization object, the temperatures of the magnetizing permanent magnets do not increase so much, even though the magnetization object heated to 380 degrees centigrade is inserted into the magnetizing space.

As understood from FIG. 10, although the pitch was 0.5 mm, i.e., too short to easily obtain a sufficient magnetization characteristic, the "Bo(ave)" value was more than 100 mT and "Bo variation" was little, which can be considered as a sufficient magnetization characteristic. It should be noted here that "Bo" refers to the surface magnetic flux density (open) and "Bo(ave)" refers to the average of the Bo peak values of all poles. In addition, "Bo variation" is defined as follows:

Bo variation={Bo(max)−Bo(min)}/Bo(ave), where "Bo(max)" is the maximum value of the Bo peak values of all poles, and "Bo(min)" is the minimum value of the Bo peak values of all poles.

Accordingly, a large Bo(ave) value indicates a high magnetization characteristic (magnetic force characteristic), and little Bo variation indicates high magnetization quality. According to the characteristic shown in FIG. 10, the magnetizing apparatus according to the present invention can offer an effective magnetization power.

Another magnetization test was performed. The magnetization object here was a ring-shaped Nd-type bonded magnet (Curie point: 350 degrees centigrade) having an outer diameter of 2.9 mm, an inner diameter of 1.0 mm, and a height of 3.0 mm. This magnetization object was magnetized in a 10-pole fashion using the magnetizing apparatus shown in FIG. 6. At this time, the magnetizing magnets used were Sm—Co sintered magnets. The heating temperature was set to 400 degrees centigrade, and the temperature of the magnetizing section was set to 80 degrees centigrade. Again, the magnetization object, immediately after having been heated, was transferred to the magnetizing section to be magnetized, and was held in the magnetizing section for a predetermined time, and then was taken out from the magnetizing section.

Figure 11:
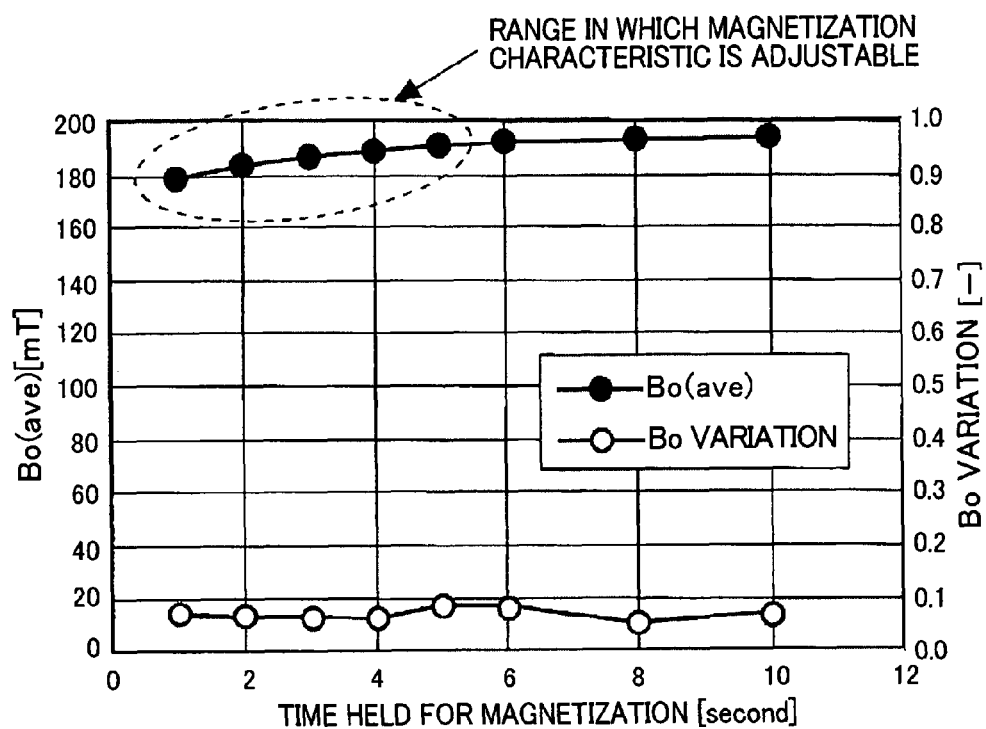
FIG. 11 is a graph showing relationships of "Bo(ave)" and "Bo variation" to the time held in the magnetizing section.

FIG. 11 shows the magnetization characteristic relative to the time that the magnetization object was held in the magnetizing section. The graph in FIG. 11 indicates that Bo variation is little since the magnetization object was heated to a temperature higher than its Curie point Tc, and that it is possible to fine-adjust the magnetization characteristic. The range circled by the dotted line in FIG. 11 is the area where the magnetization characteristic is adjustable. In this example, changing the time that the magnetization object is held in the magnetizing section enables Bo to be appropriately adjusted within the range from the Bo peak value to a value approximately 8% less than the peak value.

Furthermore, the problem of thermal demagnetization of a permanent magnet installed in a driving device such as a motor can be solved by utilizing a temperature control unit provided in the magnetizing section. In the case that magnetization is performed under room temperature like the conventional way, when the motor temperature increases, thermal demagnetization of the magnet occurs and therefore its magnetic characteristic changes. This undesirable characteristic change is prevented by causing the thermal demagnetization in advance. According to the present invention, utilizing the temperature control unit of the magnetizing section, the temperature of the magnetization object is lowered from a temperature equal to or higher than the Curie point to a temperature lower than the Curie point and equal to or higher than the guaranteed temperature of the motor. While lowering the temperature, the magnetizing field continues to be applied to the magnetization object, and is removed at a temperature equal to or higher than the motor guaranteed temperature. For example, in the case that the motor guaranteed temperature is 120 degrees centigrade, the magnetizing field is applied until the temperature is lowered to 140 degrees centigrade, and then the magnetizing field is removed and the temperature is further lowered to room temperature. In a permanent magnet prepared by this method, thermal demagnetization does not occur even when the motor temperature increases, as long as the temperature is within the motor guaranteed temperature range. Therefore, high torque can be stably obtained.

Permanent Magnet for Magnetization and Curie Point of Magnetization Object

In the above embodiments, the magnetizing permanent magnet has a higher Curie point than that of the permanent magnet serving as the magnetization object, so that the magnetizing permanent magnet can generate a magnetic field to magnetize the magnetization object in a hot atmosphere. The heating temperature is set so as to be higher than the Curie point of the permanent magnet serving as the magnetization object in order to minimize the required magnetic field for magnetizing the magnetization object. Also, the heating temperature is set so as to be lower than the Curie point of the magnetizing permanent magnet so that the magnetizing permanent magnet still keeps a magnetizing ability, that is, ability to generate a magnetic field to magnetize the magnetization object.

If the magnetization object 20 is a NdFeB isotropic magnet (Curie point: approximately 350 to 390 degrees centigrade, depends on the material), it is preferable to use Sm—Co sintered magnets (Curie point: approximately 850 degrees centigrade) as the magnetizing permanent magnets 36. In this case, the heating section 10 is required to have a capability to heat the magnetization object to a temperature equal to or higher than the Curie point Tc of the magnetization object (preferably, equal to or higher than approximately Tc+30 degrees centigrade, according to the result of the experiment).

State of Magnetization

Figure 12:
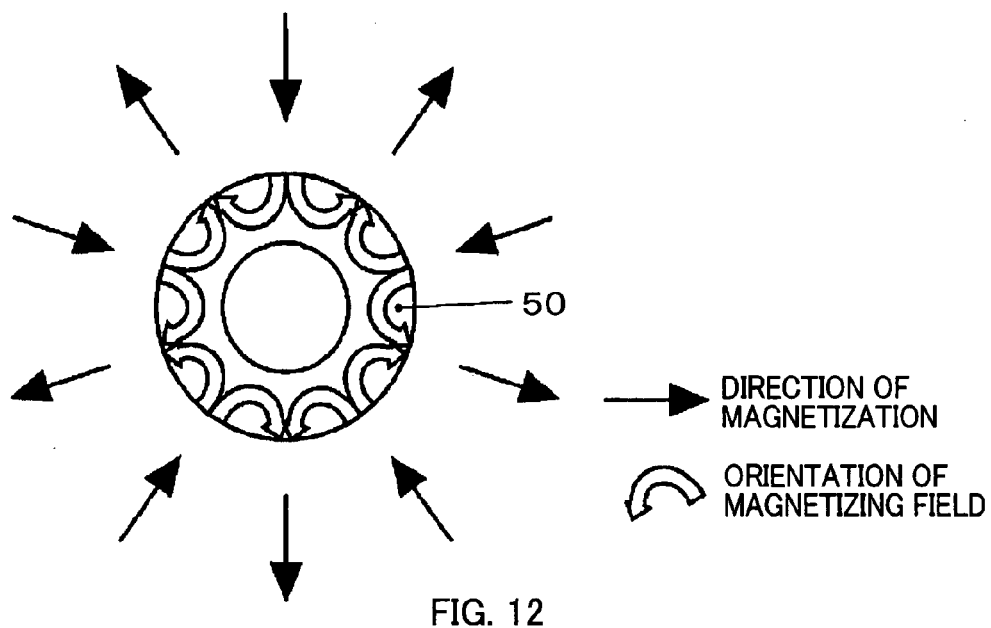
FIG. 12 illustrates a multipole-magnetized state of a ring-shaped permanent magnet magnetized by a magnetizing apparatus of the present invention.

In the above embodiments, magnetic poles according to the magnetizing magnetic poles are generated on the outer surface of the ring-shaped permanent magnet which is the magnetization object magnetized by the magnetizing apparatus, and the magnetized permanent magnet can provide sufficient magnetic fields under room temperature. FIG. 12 illustrates how a product 50, a ring-shaped permanent magnet, is magnetized to have multiple poles.

Heating

In the above embodiments, a magnetization object is heated by resistance heating. However, any other heating method may be used, such as high-frequency heating, laser heating, hot-gas-flow heating, and hot-liquid heating. The cooling may be in the form of natural cooling, or forced cooling such as water cooling and air cooling. Inert gas flow may be added in the case that some operations should be carried out in an inert atmosphere. The magnetizing method used in the magnetizing section and the structure of the magnetizing section may vary according to the diameter, dimension, and material of the permanent magnet serving as the magnetization object, the number of magnetization poles, and other factors.

Magnetizing Method

The permanent magnet magnetizing method according to the present invention includes applying magnetizing field(s) to a permanent magnet which is a magnetization object by the magnetizing section, and cooling the magnetization object from a temperature equal to or higher than the Curie point of the object to a temperature lower than the Curie point while continuing to apply the magnetizing field(s) to the magnetization object by the magnetizing section. The method is characterized in that the temperature of the magnetizing section when the magnetization object is removed from the magnetizing section is controlled to a temperature higher than the upper limit of the operation temperature or the guaranteed temperature of an electromagnetic device in which the magnetization object is incorporated. It is preferable to control the temperature of the magnetizing section to a temperature higher than 100 degrees centigrade and equal to or lower than a temperature 50 degrees centigrade below the Curie point Tc (more preferably, equal to or lower than 200 degrees centigrade). With such a temperature, it is possible to prevent initial demagnetization, and in addition to that, it is possible to adjust the surface magnetic flux density of the magnetization object according to the temperature of the magnetizing section by utilizing the thermal demagnetization effect.

Figure 13:
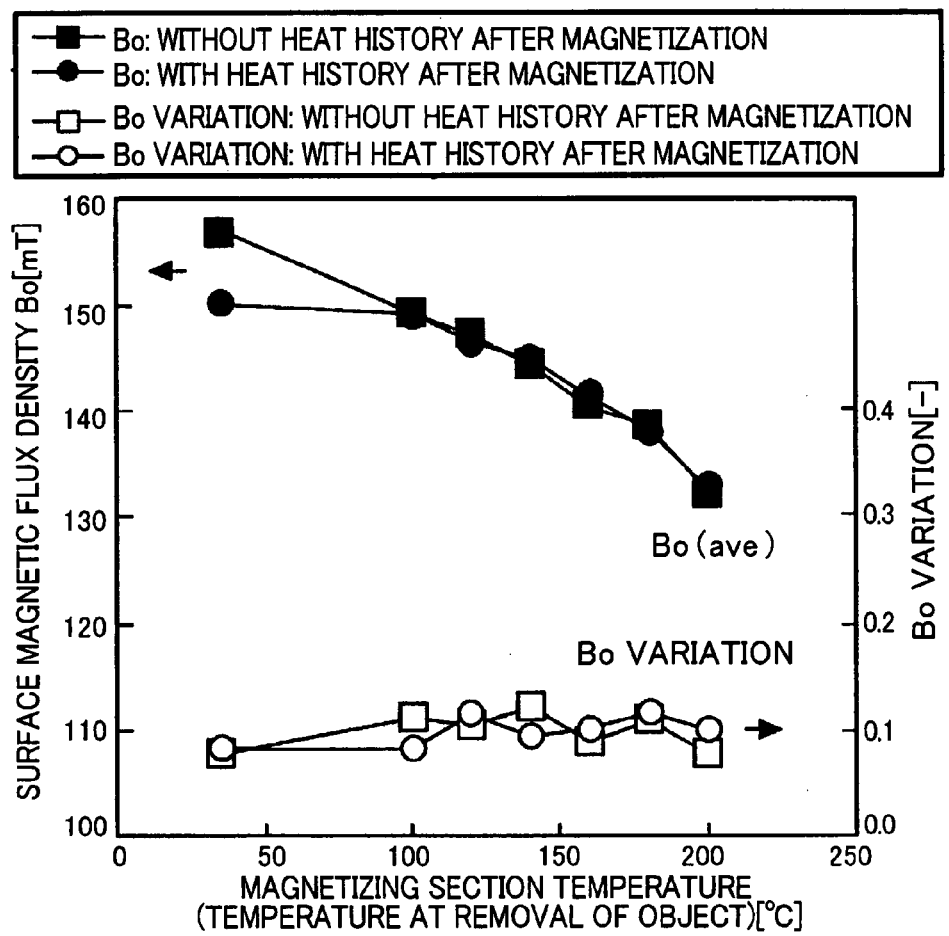
FIG. 13 is a graph showing how much the characteristic of a magnetized object is changed after the magnetized object go through heat history, depending on the magnetizing section temperature.

FIG. 13 shows exemplary relationships of the surface magnetic flux density Bo [mT] and variation of surface magnetic flux density Bo [-] relative to the magnetizing section temperature (the temperature when the object is removed) [degrees centigrade]. The magnetization object at this time was a NdFeB isotropic magnet (Curie point: approximately 350 degrees centigrade). The magnetization object was heated to 380 degrees centigrade in the heating section, and then was transferred to the magnetizing section whose temperature was controlled to a predetermined temperature, and was magnetized therein. In this example, the magnetizing section temperature was changed from 35 degrees centigrade (approximately room temperature) to 200 degrees centigrade, and for each of the temperatures, the above-mentioned magnetization was carried out and the surface magnetic flux density Bo of the magnetization object removed from the magnetizing section was measured with a gaussmeter. Then, the average of the surface magnetic flux density Bo peak values was calculated and the surface magnetic flux density Bo was obtained, and the variation of the surface magnetic flux density Bo peak values was calculated. Moreover, the same process was carried out to figure out how the characteristic of the magnetized object would be changed after the magnetized object went through a heat history at 130 degrees centigrade for one hour. FIG. 14 shows the result thereof.

First of all, the higher the magnetizing section temperature (the temperature at the removal of the magnetization object) is, the lower the surface magnetic flux density Bo is, whether with or without the heat history after magnetization. This indicates that it is possible to fine-adjust the surface magnetic flux density within around 10% thereof by controlling the magnetizing section temperature to any suitable temperature.

Next, in cases where the magnetizing section temperature (the temperature at the removal of the object) is lower than 100 degrees centigrade, the surface magnetic flux density is remarkably changed depending on whether the heat history is added or not (for example, in the case that the temperature at the removal is 35 degrees centigrade, there is a change in the surface magnetic flux density of around 4.5%). On the other hand, in cases where the temperature at the removal is over 100 degrees centigrade, the surface magnetic flux density is hardly changed depending on whether the heat history is added or not. In other words, when the object is removed from the magnetizing section at a low temperature (such as room temperature), irreversible initial demagnetization and therefore characteristic deterioration occurs. On the other hand, when the object is removed from the magnetizing section at a high temperature (such as equal to or higher than 100 degrees centigrade), an effect similar to "heat aging" (magnetic stabilization) is applied and therefore initial demagnetization is prevented.

This magnetizing method is extremely excellent because this method enables easy manufacture of a permanent magnet, achieving desired surface magnetic flux density by just controlling the temperature of the magnetizing section without requiring any change in the material of a magnetization object or strength of magnetizing field(s). In addition, with the temperature at the removal set to a temperature over 100 degrees centigrade, an effect similar to "heat aging" (magnetic stabilization) is applied and therefore characteristic deterioration in the electromagnetic device caused by initial demagnetization can be prevented. Last but not least, variation of surface magnetic flux density is little and the magnetic characteristic is stable, regardless of the temperature at the removal (around room temperature to 200 degrees centigrade).

The invention claimed is:

1. A permanent magnet magnetizing apparatus comprising:
   a heating section;
   a magnetizing section axially disposed as a discrete structure from the heating section; and
   a holding member for holding a magnetization object, the holding member being movable relative to the heating section and the magnetizing section,
   wherein the magnetization object heated in the heating section is transferred to the magnetizing section and is magnetized therein; and
   the heating section and the magnetizing section are supported so that at least one of the heating section and the magnetizing section is movable toward and away from the other; and
   the magnetization object is heated in the heating section when the magnetizing and heating sections are in a spaced-apart relation to each other, the magnetizing and heating sections are brought closer to each other while the magnetization object is still being heated, the magnetization object is then transferred to the magnetizing section to be magnetized therein, and then the magnetizing and heating sections are brought into a spaced-apart relation.

2. The permanent magnet magnetizing apparatus according to claim 1, wherein:
   the heating section uses an inner surface of a heating space for containing the magnetization object as a heating surface; the magnetizing section uses an inner surface of a magnetizing space for containing the magnetization object as a magnetizing surface; and the holding member is in the form of a bar extending through the heating and magnetizing sections and is disposed so as to be movable in the axial direction.

3. The permanent magnet magnetizing apparatus according to claim 1, wherein:

the magnetizing section includes a non-magnetic block provided with a magnetization-object-containing hole in the center thereof as a magnetizing space, the magnetization-object-containing hole allows the magnetization object to be inserted therein and taken out therefrom, a number of grooves are arranged equiangularly and radiating outward from the inner surface of the magnetization-object-containing hole, and magnetizing permanent magnets each having a Curie point higher than that of the magnetization object are laid in the respective grooves.

4. The permanent magnet magnetizing apparatus according to claim 1, wherein:

the heating section has a cylindrical structure and uses its inner surface as a heating surface;

the magnetizing section has a cylindrical structure arranged coaxially with the heating section, and uses its inner surface as a magnetizing surface; and the holding member is in the form of a bar extending through the heating and magnetizing sections and is disposed so as to be movable in the axial direction relative to the heating and magnetizing sections.

5. The permanent magnet magnetizing apparatus according to claim 4, wherein:

the magnetizing apparatus employs a vertical arrangement in which the heating section and the magnetizing section are arranged vertically and the axis extends vertically.

6. The permanent magnet magnetizing apparatus according to claim 4, wherein:

the magnetizing apparatus employs a horizontal arrangement in which the heating section and the magnetizing section are arranged side by side and the axis extends horizontally.

7. A permanent magnet magnetizing apparatus, comprising:

a heating section;

a magnetizing section axially disposed as a discrete structure from the heating section; and a holding member for holding a magnetization object, the holding member being movable relative to the heating section and the magnetizing section;

wherein the heating section has a cylindrical structure and uses its inner surface as a heating surface;

wherein the magnetizing section has a cylindrical structure and uses its inner surface as a magnetizing surface;

wherein the magnetization object heated in the heating section is transferred to the magnetizing section and is magnetized therein; and the magnetizing section is disposed above the heating section coaxially therewith, the heating section and the magnetizing section are therefore arranged in the vertical direction, and the distance between the heating section and the magnetizing section is variable, so that the magnetizing section is heated by a convection flow from the heating section and the temperature of the magnetizing section is controlled by adjusting the distance.

8. A permanent magnet magnetizing apparatus, comprising:

a heating section;

a magnetizing section axially disposed as a discrete structure from the heating section; and a holding member for holding a magnetization object, the holding member being movable relative to the heating section and the magnetizing section, wherein the temperature of the heating section is set to a temperature equal to or higher than the Curie point of the magnetization object; the temperature of the magnetizing section is set to a temperature lower than the Curie point of the magnetization object; and the magnetization object heated in the heating section is transferred to the magnetizing section and is magnetized therein; and wherein the magnetizing section includes a non-magnetic block provided with a magnetization-object-containing hole in the center thereof as a magnetizing space, the magnetization-object-containing hole allows the magnetization object to be inserted therein and taken out therefrom, a number of grooves are arranged equiangularly and radiating outward from the inner surface of the magnetization-object-containing hole, and magnetizing permanent magnets are laid in the respective grooves.

9. A permanent magnet magnetizing apparatus, comprising:

a heating section;

a magnetizing section axially disposed as a discrete structure from the heating section; and a holding member for holding a magnetization object, the holding member being movable relative to the heating section and the magnetizing section, wherein the temperature of the heating section is set to a temperature equal to or higher than the Curie point of the magnetization object; the temperature of the magnetizing section is set to a temperature lower than the Curie point of the magnetization object; and wherein the magnetizing section includes a temperature control unit capable of controlling the temperature to a temperature equal to or higher than room temperature and lower than the Curie point of the magnetization object;

wherein the magnetization object is heated in the heating section, and then is transferred to the magnetizing section and is magnetized therein, and wherein in the magnetizing section, there are arranged a plurality of magnetizing permanent magnets each having a Curie point higher than that of the magnetization object; and in the temperature control unit, a temperature at which permanent demagnetization of the magnetizing permanent magnets does not occur is set as an upper limit temperature.

10. A permanent magnet magnetizing apparatus, comprising:

a heating section;

a magnetizing section axially disposed as a discrete structure from the heating section; and a holding member for holding a magnetization object, the holding member being movable relative to the heating section and the magnetizing section, wherein the temperature of the heating section is set to a temperature equal to or higher than the Curie point of the magnetization object; the temperature of the magnetizing section is set to a temperature lower than the Curie point of the magnetization object; and wherein the magnetizing section includes a temperature control unit capable of controlling the temperature to a temperature equal to or higher than room temperature and lower than the Curie point of the magnetization object;

wherein the magnetization object is heated in the heating section, and then is transferred to the magnetizing section and is magnetized therein, wherein
in the magnetizing section, Nd-type sintered magnets are arranged; and
in the temperature control unit, a temperature at which permanent demagnetization of the Nd-type sintered magnets used for magnetization does not occur is set as an upper limit temperature.

* * * * *

UNITED STATES PATENT AND TRADEMARK OFFICE
CERTIFICATE OF CORRECTION

PATENT NO. : 7,821,365 B2
APPLICATION NO. : 11/886081
DATED : October 26, 2010
INVENTOR(S) : Haruhiro Komura et al.

Page 1 of 1

It is certified that error appears in the above-identified patent and that said Letters Patent is hereby corrected as shown below:

Title Page, Column 1, (73) Assignee:
"FDK Corporation, Tokyo (JP)" should be --Minebea Co., Ltd., Nagano (JP)--

Signed and Sealed this
Twentieth Day of September, 2011

David J. Kappos
*Director of the United States Patent and Trademark Office*